United States Patent
Kleinsasser et al.

(10) Patent No.: US 9,815,436 B2
(45) Date of Patent: Nov. 14, 2017

(54) HEATED WINDSHIELD WIPER SYSTEM FOR VEHICLE

(71) Applicant: Thermalblade LLC, Muncy Valley, PA (US)

(72) Inventors: George Kleinsasser, Ste. Agathe (CA); Harry Kleinsasser, Muncy Valley, PA (US)

(73) Assignee: Thermalblade LLC, Muncy Valley, PA (US)

(*) Notice: Subject to any disclaimer, the term of this patent is extended or adjusted under 35 U.S.C. 154(b) by 318 days.

(21) Appl. No.: 14/425,975

(22) PCT Filed: Jan. 31, 2014

(86) PCT No.: PCT/US2014/014126
§ 371 (c)(1),
(2) Date: Mar. 4, 2015

(87) PCT Pub. No.: WO2014/121061
PCT Pub. Date: Aug. 7, 2014

(65) Prior Publication Data
US 2015/0321645 A1 Nov. 12, 2015

Related U.S. Application Data

(60) Provisional application No. 61/758,843, filed on Jan. 31, 2013.

(51) Int. Cl.
*B60S 1/38* (2006.01)

(52) U.S. Cl.
CPC .......... *B60S 1/3805* (2013.01); *B60S 1/3848* (2013.01); *B60S 1/381* (2013.01); *B60S 2001/3818* (2013.01); *B60S 2001/3836* (2013.01)

(58) Field of Classification Search
CPC ......... B60S 1/3805; B60S 1/487; B60S 1/488
USPC ......................................... 15/250.05–250.09
See application file for complete search history.

(56) References Cited

U.S. PATENT DOCUMENTS

| | | | |
|---|---|---|---|
| 4,638,850 A | 1/1987 | Newell et al. | |
| 5,655,251 A | 8/1997 | Dileo et al. | |
| 6,137,084 A | 10/2000 | Thomas | |
| 6,236,019 B1 | 5/2001 | Piccione et al. | |
| 2012/0005856 A1 | 1/2012 | Jones | |

*Primary Examiner* — Andrew A Horton
(74) *Attorney, Agent, or Firm* — Adrian D. Battison; Ade & Company Inc.

(57) ABSTRACT

A heated wiper system includes a wiper blade with a resilient wiper element having a passage along the wiper element from an opening at one end of where a heating element is inserted into the passage. The temperature of the heating element is controlled by controlling the current supplied to the element by a control unit contained either in the engine compartment or in a recess on the wiper blade. The control unit uses an algorithm including wiper blade and outside ambient temperature, wind chill, ignition on, motor running, heating element resistance value and wipers and varies the current supplied in dependence on a value of the resistance of the heating element.

5 Claims, 5 Drawing Sheets

HEATED WINDSHIELD WIPER SYSTEM FOR VEHICLE

CROSS-REFERENCE TO RELATED APPLICATIONS

This application claims domestic priority on U.S. Provisional Patent Application Ser. No. 61/758,843, filed on Jan. 31, 2013, the content of which is incorporated herein by reference.

This invention relates to a heated windshield wiper system for a vehicle.

BACKGROUND OF THE INVENTION

In colder climates, the build-up of ice on vehicle windshield wiper blades is a common problem. The ice causes the wiper blades to operate poorly which is an annoyance to drivers and can become a significant road hazard if the visibility of the driver through the windshield is significantly reduced.

Various wiper heating devices have attempted to overcome the problem of ice build-up on wiper blades by mounting a heating element in close proximity to or directly in engagement with the wiper blades. In order for the heating element to operate effectively it is generally required that the heating element directly engage the wiper blade. Known heating devices however generally mount the heating element integrally within the wiper or wiper blade such that replacement of the wipers requires replacement of the heating element or portions thereof. The periodical replacement of the wipers can thus be expensive and requires time consuming assembly.

U.S. Pat. No. 6,028,291 issued to Heisler and U.S. Pat. No. 4,497,083 issued to Nielsen each provide a heated windshield wiper system in which a heater element extends through the resilient wiper element of a wiper blade. In each instance a releasable connector supplies power to the heating element at one end of the resilient wiper element permitting the heating element and wiper element to be replaced without replacement of the entire wiper blade. In the event that the wiper blade requires replacement however considerable rewiring of the heating element is required. Heisler in particular provides a thermostat mounted on the wiper blade in a location requiring replacement of the electrical supply wiring in the event that the thermostat fails and requires replacement.

U.S. Pat. No. 3,408,678 issued to Linker provides a windshield wiper assembly in which a heating element extends along the resilient wiper element. The electrical supply wiring to the heating element includes selective couplings at a location where the wiper blade mounts on a supporting wiper arm such that the entire blade including the heating element can be replaced. The heating element and selective coupling in this instance however are required to be formed integrally with the wiper blade and therefore do not permit independent replacement of the various components of the wiper assembly.

Many other patents for example those listed in U.S. Pat. No. 7,721,382 (Malone) issued May 25, 2010 provide other designs of windshield wiper which can be heated. Examples are U.S. Pat. Nos. 6,137,084, 7,568,256, 5,572,765, 7,721,382, 6,591,443, 6,140,608, 6,058,664, 6,754,933, 7,401,379, and 5,787,543.

In U.S. Pat. No. 6,507,973 (Friesen) is shown an arrangement of this type where the electrical resistance is changed for different length heating elements.

SUMMARY OF THE INVENTION

According to a first aspect of the invention there is provided a heated wiper system for mounting on the wiper arms of a wiper assembly of a vehicle, the system comprising:

a wiper blade arranged to be selectively mounted on a free end of each wiper arm, the wiper blade including a resilient wiper element having a passage extending through the wiper element in a longitudinal direction of the wiper element from an opening at one end of the wiper element;

a heating element arranged to be received within the passage extending through each wiper element;

the heating element being arranged for connection to an electrical supply arranged to supply electrical power to the heating elements;

wherein the temperature of the heating element is controlled by controlling the current supplied to the element.

Preferably the current is controlled by a control unit having an algorithm for determining a required current.

Preferably the algorithm of the control unit includes information relating to the wiper blade temperature and an outside ambient temperature.

In some cases the control unit is arranged to communicate with an on vehicle computer to receive information therefrom.

In this arrangement the information can include one or more of ignition on, motor running, wipers are on and vehicle speed used for wind chill correction.

In one embodiment the current is controlled using a control unit which is mounted separate from the wiper blade.

In some cases the current is controlled using a resistor divider or pre-set potentiometer.

In some cases the current is controlled using a resistance sensor for detecting a resistance value of the heating element. However the resistance value can be directly input manually or input as a value taken from the wiper blade concerned which is indicative of the resistance value.

In another embodiment the temperature of the heating element is controlled by a smart wiper blade technology mounted in the wiper itself. In this case the algorithm of the Smart Wiper Blade technology can include the wiper blade temperature and the outside ambient temperature. In this case the Smart Wiper Blade technology can be programmable and can have the option of using the wiper blade and outside ambient temperature, wind chill, ignition on, motor running, heating element resistance value and wipers are on in the algorithm.

Preferably the heating element being arranged for connection by conductors to an electrical supply arranged to supply electrical power to the heating elements and the conductors are contained within a housing of the wiper blade to make it more cosmetically appealing.

That is preferably a two wire conductor is placed in a cavity underneath the housing and along the length or part length of the blade.

In this case a control unit connected to the conductors is placed in a cavity underneath the housing and along the length or part length of the blade.

According to a second aspect of the invention there is provided a heated wiper system for mounting on the wiper arms of a wiper assembly of a vehicle, the system comprising:

a wiper blade arranged to be selectively mounted on a free end of each wiper arm, the wiper blade including a resilient wiper element having a passage extending through the wiper element in a longitudinal direction of the wiper element from an opening at one end of the wiper element;

a heating element arranged to be received within the passage extending through each wiper element;

the heating element being arranged for connection to an electrical supply arranged to supply electrical power to the heating elements;

wherein the heating element comprises a self-regulating heat trace product.

Preferably the heat trace product comprises two parallel bus wires encased in a semi-conductive polymer where the polymer becomes less conductive as it heats up.

Preferably the heat trace product heats only to a pre-set temperature.

Preferably there is provided a one piece extrusion for the squeegee which includes the Heat Trace as the core of the squeegee.

Preferably the silicone squeegee is extruded right onto the Heat Trace so that it is one unit, so that when the squeegee is replaced, the Heat Trace Element is also replaced.

According to a second aspect of the invention there is provided a heated wiper system for mounting on the wiper arms of a wiper assembly of a vehicle, the system comprising:

a wiper blade arranged to be selectively mounted on a free end of each wiper arm, the wiper blade including a resilient wiper element having a passage extending through the wiper element in a longitudinal direction of the wiper element from an opening at one end of the wiper element;

a heating element arranged to be received within the passage extending through each wiper element;

the heating element being arranged for connection by conductors to an electrical supply arranged to supply electrical power to the heating elements;

wherein the conductors are contained within a housing of the wiper blade to make it more cosmetically appealing.

Preferably a two wire conductor is placed in a cavity underneath the housing and along the length or part length of the blade.

Preferably a PC Board connected to the conductors is placed in a cavity underneath the housing and along the length or part length of the blade.

According to a third aspect of the invention there is provided a heated wiper system for mounting on the wiper arms of a wiper assembly of a vehicle, the system comprising:

a wiper blade arranged to be selectively mounted on a free end of each wiper arm, the wiper blade including a resilient wiper element having a passage extending through the wiper element in a longitudinal direction of the wiper element from an opening at one end of the wiper element;

a heating element arranged to be received within the passage extending through each wiper element;

the heating element being arranged for connection to an electrical supply arranged to supply electrical power to the heating elements;

wherein the temperature of the heating element is controlled by controlling the current supplied to the element.

Preferably the current is controlled by a Microprocessor controlled PC Board communicating with the on vehicle computer.

Preferably an algorithm of the PC Board includes the wiper blade temperature and the outside ambient temperature.

Preferably the PC Board uses other information from the on vehicle computer.

Preferably the information includes one or more of ignition on, motor running, heating element resistance value, wipers are on and vehicle speed used for wind chill correction.

Preferably the current is controlled using a standalone Microprocessor.

Preferably microprocessor is programmable and has the option of using the wiper blade and outside ambient temperature, wind chill, ignition on, motor running, heating element resistance value and wipers are on in the algorithm.

According to a fourth aspect of the invention there is provided a heated wiper system for mounting on the wiper arms of a wiper assembly of a vehicle, the system comprising:

a wiper blade arranged to be selectively mounted on a free end of each wiper arm, the wiper blade including a resilient wiper element having a passage extending through the wiper element in a longitudinal direction of the wiper element from an opening at one end of the wiper element;

a heating element arranged to be received within the passage extending through each wiper element;

the heating element being arranged for connection to an electrical supply arranged to supply electrical power to the heating elements;

wherein the temperature of the heating element is controlled by a Microprocessor controlled PC Board communicating with the on vehicle computer.

Preferably an algorithm of the PC Board includes the wiper blade temperature and the outside ambient temperature.

Preferably the PC Board uses other information from the on vehicle computer.

Preferably the information includes one or more of ignition on, motor running, wipers are on and vehicle speed used for wind chill correction.

Preferably the current is controlled using a standalone Microprocessor.

Preferably microprocessor is programmable and has the option of using the wiper blade and outside ambient temperature, wind chill, ignition on, motor running, heating element resistance value and wipers are on in the algorithm.

Preferably the current is controlled using a standalone Microprocessor that is set using a resistor divider or pre-set potentiometer that is mounted on the PC Board.

According to a fifth aspect of the invention there is provided a heated wiper system for mounting on the wiper arms of a wiper assembly of a vehicle, the system comprising:

a wiper blade arranged to be selectively mounted on a free end of each wiper arm, the wiper blade including a resilient wiper element having a passage extending through the wiper element in a longitudinal direction of the wiper element from an opening at one end of the wiper element;

a heating element arranged to be received within the passage extending through each wiper element;

the heating element being arranged for connection to an electrical supply arranged to supply electrical power to the heating elements;

wherein the temperature of the heating element is controlled by a Smart Wiper Blade technology mounted in the wiper itself.

Preferably an algorithm of the smart wiper blade technology includes the wiper blade temperature and the outside ambient temperature.

Preferably the Smart Wiper Blade technology uses other information from the on vehicle computer.

Preferably the information includes one or more of ignition on, motor running, wipers are on and vehicle speed used for wind chill correction.

Preferably the smart wiper blade technology is programmable and has the option of using the wiper blade and outside ambient temperature, wind chill, ignition on, motor running and wipers are on in the algorithm.

Figures 1A, 1B, 1C:
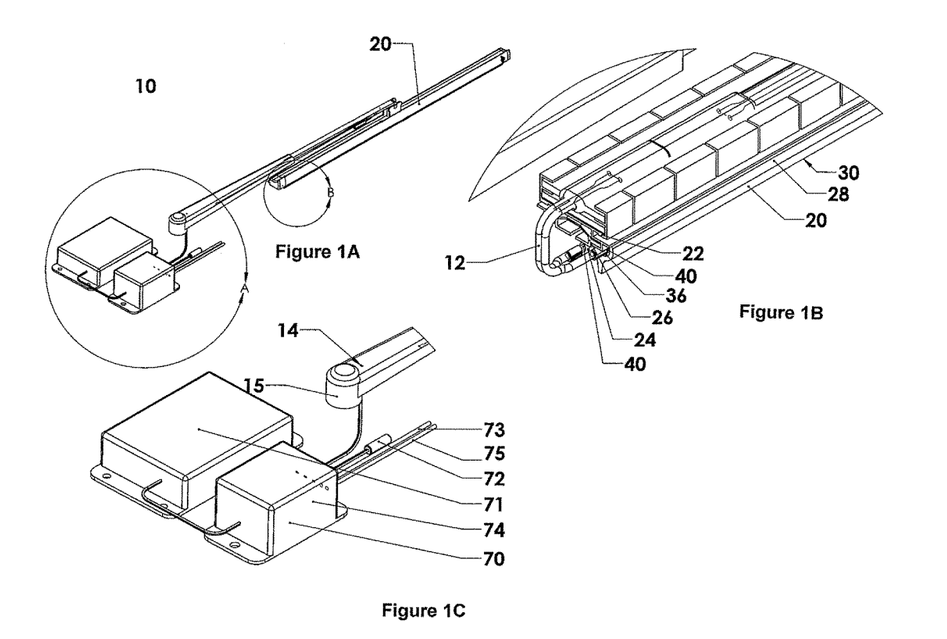
FIG. 1A is a schematic isometric illustration of a heated windshield wiper according to the present invention showing an embodiment where the current or power supply to the heating element is controlled by a control unit located in the vehicle engine compartment.
FIG. 1B is an enlarged view of one part only of the embodiment of FIG. 1A.
FIG. 1C is an enlarged view of one part only of the embodiment of FIG. 1A.

Key points of the invention are as follows:

1 Using self-regulating heat trace type product for the heat source there are provided two parallel bus wires encased in a semi-conductive polymer. This polymer is loaded with a secret mixture of carbon and other plastic conductive polymers which becomes less conductive as it heats up. Thereby heats only to a temperature determined by the amount of Carbon and other product that is loaded into the polymer. (See FIG. 1)

2 The system uses conductors supplying the power source to the heating element into the housing of the wiper frame to make it more cosmetically appealing. This is accomplished either using a two wire conductor or a PC Board placed in a cavity underneath the housing and or along the length or part length of the frame.

3 The system also has the option of controlling the temperature of a standard heating element by controlling the current supplied to the element. The current is controlled by a microprocessor controlled PC Board communicating with the on vehicle computer. The algorithm can include but not be limited to the wiper blade temperature and the outside ambient temperature to supply more current at colder temperatures and less at higher temperatures. The system may also use other information but not be limited to from the on vehicle computer such as ignition on, motor running, wipers are on and vehicle speed used for wind chill correction.

4 The system can also provide the option of controlling the temperature of a standard heating element by controlling the current supplied to the element. The current is controlled using a standalone Microprocessor or analog circuit PC Board that is set using a resistor divider or pre-set potentiometer that is mounted on the PC Board. The microprocessor version can also be programmable and can have the option of using the wiper blade and outside ambient temperature, wind chill, ignition on, motor running, heating element resistance value and wipers-are-on in the algorithm.

5 Smart Wiper Blade technology can include Items 3 and 4 above, or combinations thereof which are provided in a circuit board on the wiper itself instead of a standalone PC Board.

6 The system can use a one piece extrusion for the squeegee which would include the heat trace system as the core of the squeegee. The silicone squeegee is extruded right onto the heat trace so that it is one unit, so when the squeegee is replaced the heat trace element is also replaced.

According to a further important independent aspect of the invention, the heating element comprises an elongate member containing two wires where the member is slid into a tubular container in the wiper blade where at one end the wires are connected to power supply and at the far end of the container the wires are crimped together.

According to a yet further important aspect of the present invention, the wires connected to the heating element are mounted using special designed plastic or metal clips so as to make the design more cosmetically appealing.

DETAILED DESCRIPTION

Referring to the accompanying drawings, in FIGS. 1A, 1B, 1C and 2 there is illustrated a wiper assembly generally indicated by reference numeral 10 having a wiper heating system 12 mounted thereon. The wiper heating system 12 is arranged to heat the wiper blade 20 of the wiper assembly 10 so as to prevent the build-up of ice thereon when in use in colder climates.

The wiper assembly 10 includes a wiper arm 14 which is pivotally mounted at its base as in a conventional vehicle wiper blade assembly. A tension spring is mounted at the base of the arm so as to bias the arm against the windshield of a vehicle having the assembly mounted thereon. An articulation joint is mounted at a free end of the arm for pivotally and selectively mounting a wiper blade thereon. The wiper blade 20 includes a longitudinally extending wiper receiving channel 22 for mounting a wiper element 24 therein.

The wiper heating system 12 includes the wiper element 24 in the form of an elongate resilient member formed of silicone rubber. The wiper element 24 includes a mounting portion 26 extending longitudinally along an inner side of the element. The mounting portion 26 is a T-shaped flange similar to conventional wiper elements for mounting the wiper element within the channel 22 of the wiper blade. The wiper element 24 further includes a tubular portion 28 extending in the longitudinal direction of the wiper along the mounting portion.

A wiping portion 30 extends longitudinally along an outer side of the wiper element for engaging the vehicle windshield. The wiping portion can include a primary lip in the form of a radially extending flange as well as a pair of shorter secondary lips located on each side of the primary lip and extending radially outward from the tubular portion as well.

An axially extending passage 36 extends through the tubular portion 28 of the wiper element in the longitudinal direction of the wiper between openings located at respective ends of the wiper element. The passage 36 is spaced between the respective inner and outer sides of the wiper element.

A heating element 40 is mounted within the passage 36 and is arranged to extend the full length of the wiper element.

The resilient material of the wiper element 24 is arranged to deform about the heating element 40 when the heating element is mounted therein so as to secure the heating element therein by snugly engaging respective sides of the element. Both the heating element 40 and the passage 36 have a circular cross section so as to snugly receive the heating element within the passage without requiring additional mounting means to secure the heating element therein.

The resilient nature of the wiper element 24 allows the heating element 40 to remain selectively slidable in a longitudinal direction within the passage 36 so as to be selectively separable from the wiper element by sliding the heating element through one of the elements 38 located at respective ends of the passage. In this arrangement, the wiper blade 20 or the wiper element 24 can be independently replaced without replacing the heating element 40.

Figure 5:
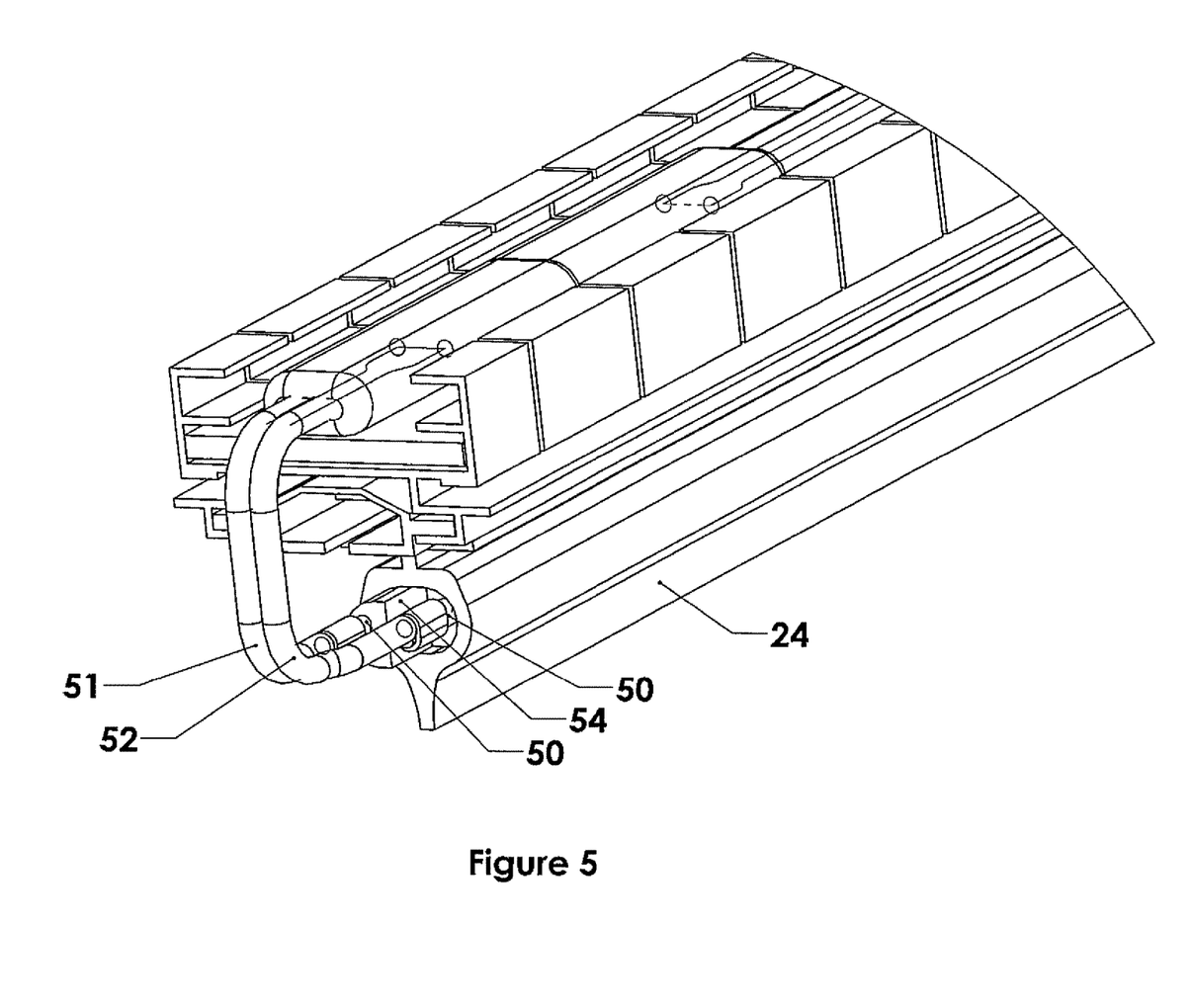
FIG. 5 is an end elevational view of the wiper blade of an alternative arrangement which uses a self-regulating heat trace product.

FIG. 5 shows a pair of insulated electrical supply leads 51 and 52 is coupled to the free ends 50 of the conductive wire to provide an electrical current there through. A sealed resilient sleeve 54 can be wrapped about an end of the heating element 40 having the free ends 50 of the conducting wire therein and extends over the electrical supply leads 51, 52 so as to seal the wires therein and protect them from the elements.

Figure 2:
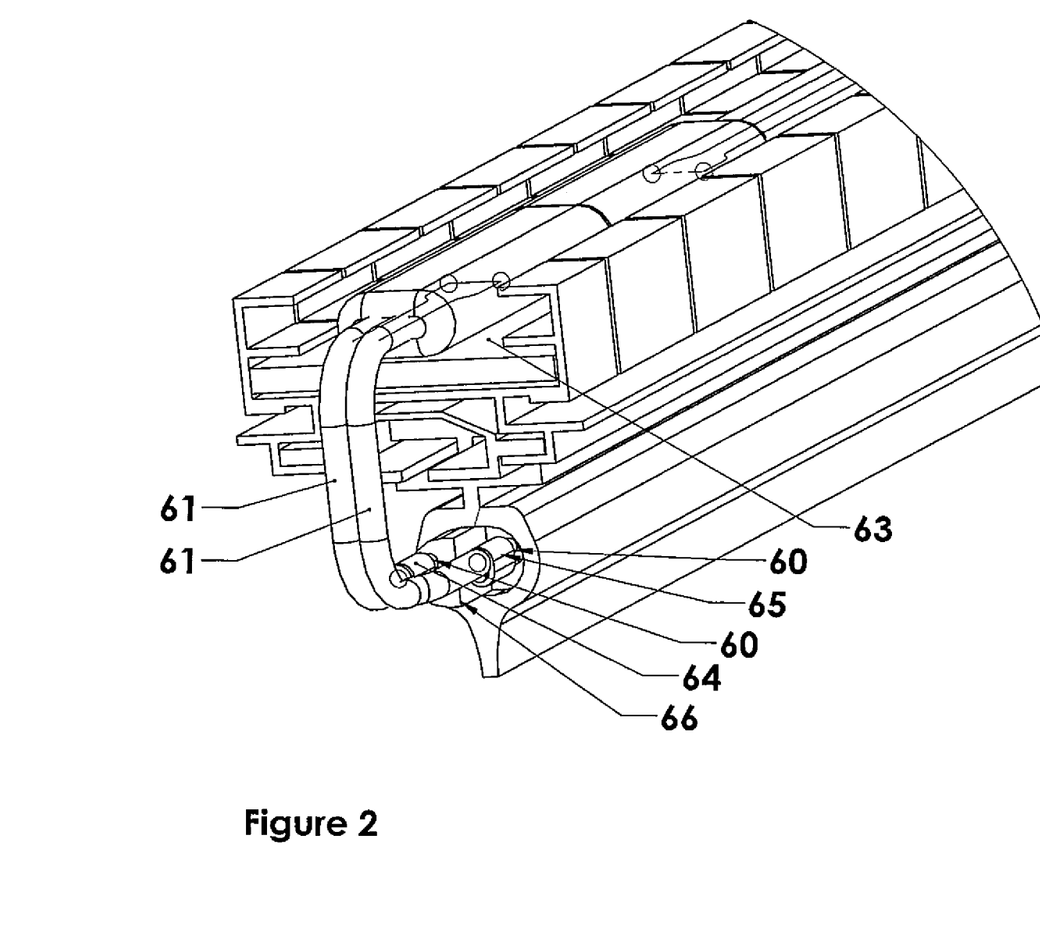
FIG. 2 is an enlarged view showing one end of the blade construction of FIG. 1.

As shown in FIG. 2 using a conventional heating wire 60 the conductors 61 are contained within a housing 62 of the wiper blade to make it more cosmetically appealing. That is a two wire conductor is placed in a cavity 63 underneath the housing 62 and along the length or part length of the blade. The two wire conductor 61 is crimped to the heating wire 60. The two crimps 64 and 65 are offset so as to not cause a short circuit. Crimp 64 then gets a heat shrink tubing then a heat shrink tubing is placed over both crimps 64 and 65 along with the two conductors 61 and heating element tubing 66.

Thus the heating element comprises an elongate member containing two wires where the member is slid into a tubular container in the wiper blade where at one end the wires are connected to power supply and at the far end of the container the wires are crimped together.

The wires to the heating element are mounted using special designed plastic or metal clips so as to make the design more cosmetically appealing.

Figure 3:
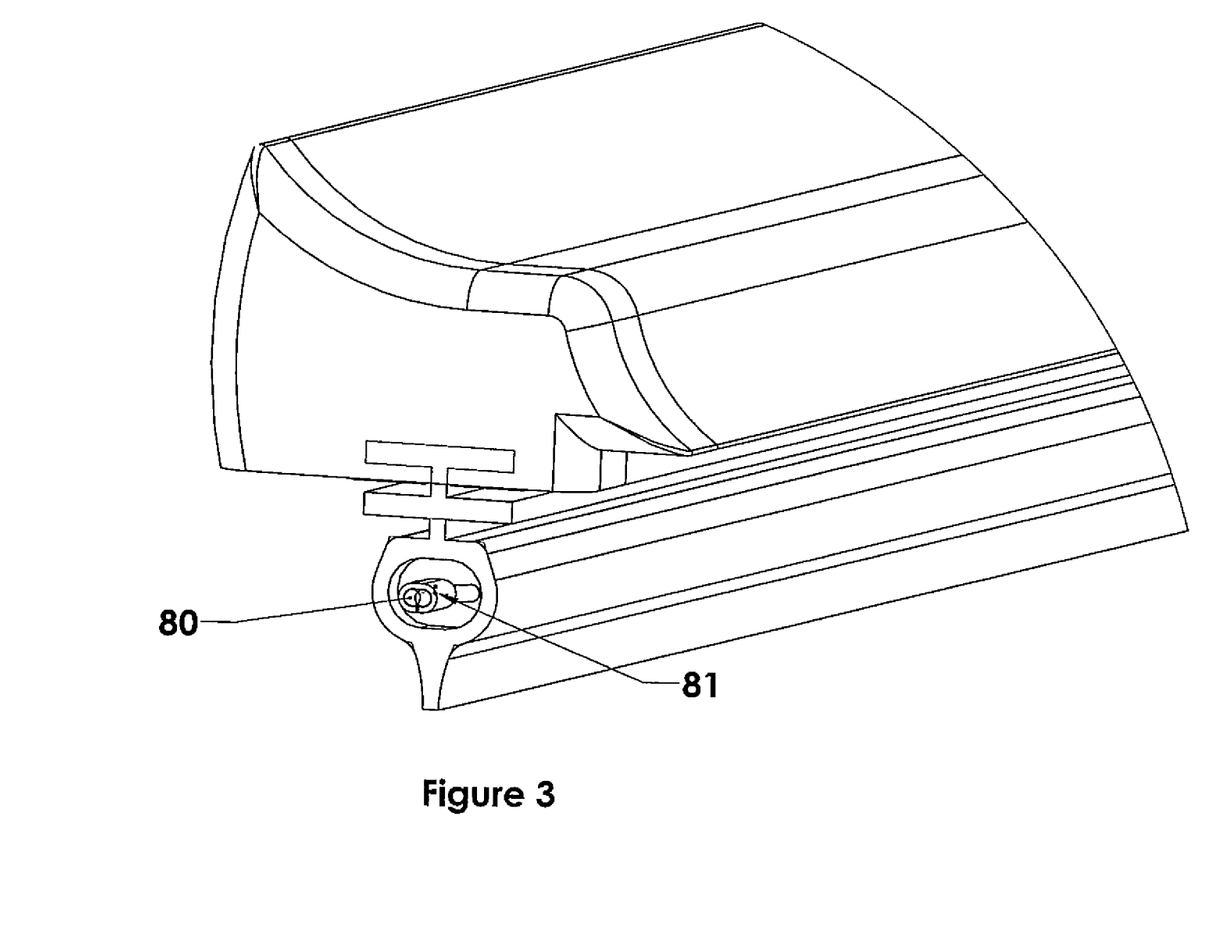
FIG. 3 is an enlarged view showing the other end of the blade construction of FIG. 1.

FIG. 3 shows the end opposite the supply end, it shows the heating element conductors 80 being crimped at crimp locations 81. This method reduces the time required to assemble a wiper.

In FIG. 1 a PC Board or control unit 70 connected to the conductors is placed in a container 70 in the engine compartment. The circuit board has a control functions wherein the temperature of the heating element is controlled by controlling the current supplied to the element.

As shown the control unit 70 is arranged for communicating with the on vehicle computer 71 so that the algorithm of the PC Board includes the wiper blade temperature and the outside ambient temperature. The control uses other information from the on vehicle computer such as of ignition on, motor running, wipers are on and vehicle speed used for wind chill correction.

The control unit 70 also can communicate with an installed temperature sensor 72 to receive information relating to the exterior temperature. In a simple version of the system, the control unit is not arranged to use information from the vehicle controller but instead to use a separately installed exterior temperature sensor 72. This reduces the complexity of install communication. Another input is a battery voltage detector 73 which detects battery voltage from the conductor supplying power to the controller so as to more accurately calculate a required current so that the power supplied to the heating element is accurately controlled. This is achieved by sensing the pulses coming from the vehicle's alternator. In a simple arrangement, the control unit includes a resistance sensor 74 which detects the resistance of the heating element attached to the control unit so as to control the value of the current to meet a required power output. Thus the control unit, which is generic for many different models of vehicle, is responsive to the resistance value of the heating element installed for that model and uses that resistance value to calculate the required power and/or the required current for example using a look-up table.

The control unit can use pulse width modulation (PWM) technology to control the current output to the heating elements when calculated. Such a PWM Wiper Controller can have the following features:

The purpose of this controller is to switch on a Heating Element on a Windshield Wiper and control the current for the different sizes required for all vehicles. It is mounted under the hood of a vehicle in the engine compartment, sense when the Motor is running, read the outside temperature and supply the proper current required for the wiper size installed that is by receiving a signal proportional to or indicative of the resistance level of the wipe installed and to supply that current only when the outside temperature falls below approximately 4 degrees Celsius.

It needs one Analog input for a Temperature Sensor with a 1 degree Celsius resolution that reads from minus 40 to plus 100 degrees Celsius.

It needs one Analog input for reading the pulsed Battery voltage in the range 0 to 18 volts.

It needs one Analog input for reading the resistance of the heating element in the range 0-10 ohms. Alternatively a It needs two PWM Outputs (one of each wiper blade) capable of producing up to 5 Amps of Current each at 13.8 Volts.

The heating elements get switched on when the motor is started, pulsing the Battery voltage and the outside temperature drops to below 4 Degrees Celsius.

A resistance lookup table for supplying PWM pulse width modulated current to the heating element is required. That is the control unit has an input for detecting directly the actual resistance of the heating element or for receiving a manual input indicative of the resistance to be selected. This value is then used in the LUT to identify the current value to be provided using the PWM system.

The control unit is housed in a small sealed aluminum box that has two mounting flanges with a hole on each flange for mounting the box under the hood of a vehicle. The mounting flange is on the open side of the box and raises the box 4 mm to allow space for the wires. The aluminum box can include cooling fins.

The PC Board is encapsulated using a potting compound suitable for protecting it from moisture. The wires or terminals come out through the potting compound approximately 2.5 mm from the edge of the box and approximately 2.5 mm between wires.

The power supply cables include one 30 cm black wire with a ring terminal and one 100 cm red wire with an inline fuse 30 cm from the aluminum box.

The temperature sensor is encapsulated into a barbed rubber fitting at the end of a 30 cm wire so that it can be pushed into a hole drilled into the fender of the vehicle.

Four male spade terminals are mounted in such a way so as to be able to connect the wires coming from the wipers. These are clearly labeled Wiper 1 and Wiper 2.

The microprocessor is programmable and has the option of using the wiper blade and outside ambient temperature, wind chill, ignition on, motor running and wipers are on in the algorithm.

The algorithm of the PC Board includes the wiper blade temperature and the outside ambient temperature.

Figure 4:
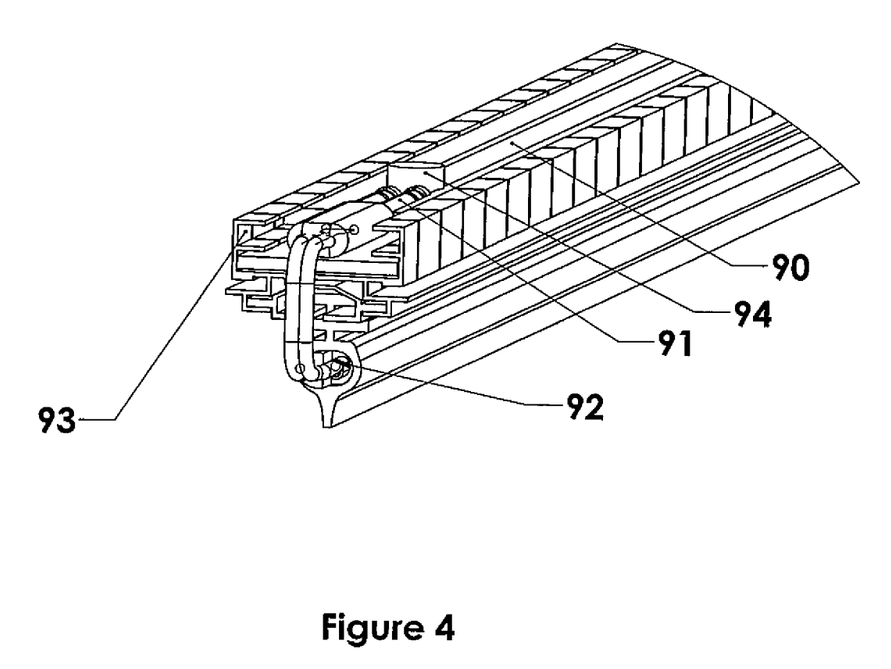
FIG. 4 is an enlarged end view similar to that of FIG. 2 showing a further embodiment where the current or power supply to the heating element is controlled by a control unit located on the windshield wiper blade support.

As shown in FIG. 4, the temperature of the heating element is controlled by a smart wiper blade technology mounted in the wiper itself. The microprocessor and other components are mounted on 90 a printed circuit board that slides into a slot 93 on the wiper frame. The heating element 92 gets plugged into a connector 91 mounted on the printed circuit board.

The circuit board has a control functions wherein the temperature of the heating element is controlled by controlling the current supplied to the element.

As shown the control unit 90 is arranged for communicating with the on vehicle computer so that the algorithm of the PC Board includes the wiper blade temperature and the outside ambient temperature. The control uses other information from the on vehicle computer such as of ignition on, motor running, wipers are on and vehicle speed used for wind chill correction.

In a simple version of the system, the control unit is not arranged to use information from the vehicle controller but instead to use a separately installed exterior temperature sensor 94. This reduces the complexity of install communication. The battery voltage is detected from the conductor supplying power to the controller so as to more accurately calculate a required current so that the power supplied to the heating element is accurately controlled. This is achieved by sensing the pulses coming from the vehicles alternator. In a simple arrangement, the control unit includes a built in resistance sensor which detects the resistance of the heating element attached to the control unit so as to control the value of the current to meet a required power output. Thus the control unit, which is generic for many different models of vehicle, is responsive to the resistance value of the heating element installed for that model and uses that resistance value to calculate the required power and/or the required current for example using a look-up table.

The control unit can use pulse width modulation (PWM) technology to control the current output to the heating elements when calculated. Such a PWM Wiper Controller can have the following features:

The purpose of this controller is to switch on a Heating Element on a Windshield Wiper and control the current for the different sizes required for all vehicles. It is mounted windshield wiper frame, senses when the Motor is running, reads the outside temperature and supply's the proper current required for the wiper size installed that is by receiving a signal proportional to or indicative of the resistance level of the wipe installed and to supply that current only when the outside temperature falls below approximately 4 degrees Celsius.

It needs one Analog input for a Temperature Sensor with a 1 degree Celsius resolution that reads from minus 40 to plus 100 degrees Celsius.

It optionally needs one Analog input for a Wiper blade Temperature Sensor with a 1 degree Celsius resolution that reads from minus 40 to plus 100 degrees Celsius.

It needs one Analog input for reading the pulsed Battery voltage in the range 0 to 18 volts.

It needs one Analog input for reading the resistance of the heating element in the range 0-10 ohms. Alternatively a It needs one PWM Output capable of producing up to 5 Amps of Current at 13.8 Volts.

The heating element get switched on when the motor is started, pulsing the Battery voltage and the outside temperature drops to below 4 Degrees Celsius.

A resistance lookup table for supplying PWM pulse width modulated current to the heating element is required. That is the control unit has an input for detecting directly the actual resistance of the heating element or for receiving a manual input indicative of the resistance to be selected. This value is then used in the LUT to identify the current value to be provided using the PWM system.

The controller unit is housed the wiper blade frame by sliding into a slot provided for that purpose The PC Board is encapsulated using a potting compound or other product suitable for protecting it from moisture. The wires come out on the frame, get mounted with special clips to the wiper frame to make it cosmetically appealing. They get routed under the hood to suitable connection points.

The temperature sensor is mounted on the PC Board which in turn is mounted on the wiper frame.

The microprocessor is programmable and has the option of using the wiper blade and outside ambient temperature, wind chill, ignition on, motor running and wipers are on in the algorithm.

The algorithm of the PC Board includes the wiper blade temperature and the outside ambient temperature.

As shown in FIG. 5, the heating element comprises a self-regulating heat trace product 50 where the heat trace product comprises two parallel bus wires 51, 52 encased in a semi-conductive polymer 53 where the polymer becomes less conductive as it heats up so that the heat trace product heats only to a pre-set temperature This can be provided as a one piece extrusion for the squeegee which includes the Heat Trace as the core of the squeegee. In this way the silicone squeegee 24 is extruded right onto the Heat Trace 50 so that it is one unit, so that when the squeegee is replaced, the Heat Trace Element is also replaced or it can be a separate heating element that get inserted into the silicone wiper blade.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A heated wiper system for mounting on wiper arms of a wiper assembly of a vehicle, the system comprising:
a wiper blade arranged to be selectively mounted on a free end of each wiper arm, the wiper blade including a resilient wiper element having a passage extending through the wiper element in a longitudinal direction of the wiper element from an opening at one end of the wiper element;
a heating element arranged to be received within the passage extending through each wiper element;
the heating element being arranged for connection to an electrical supply arranged to supply electrical power to the heating element;
wherein a temperature of the heating element is controlled by controlling a current supplied to the element;
wherein the current is controlled by a control unit having an algorithm for determining a required current; and
wherein the current is controlled using a resistance sensor for detecting a resistance value of the heating element.

2. The wiper system according to claim 1 wherein the algorithm of the control unit includes information relating to a temperature of the wiper blade and an outside ambient temperature.

3. The wiper system according to claim 1 wherein the control unit is arranged to communicate with an on vehicle computer to receive information therefrom.

4. The wiper system according to claim 3 wherein the control unit is arranged such that the information includes one or more of ignition on, motor running, heating element resistance value, wipers are on and vehicle speed used for wind chill correction.

5. The wiper system according to claim 1 wherein the current is controlled using a control unit separate from the wiper blade.

* * * * *